(12) United States Patent
Sutskever et al.

(10) Patent No.: US 10,503,837 B1
(45) Date of Patent: *Dec. 10, 2019

(54) TRANSLATING TERMS USING NUMERIC REPRESENTATIONS

(71) Applicant: Google LLC, Mountain View, CA (US)

(72) Inventors: Ilya Sutskever, Mountain View, CA (US); Tomas Mikolov, Jersey City, NJ (US); Jeffrey Adgate Dean, Palo Alto, CA (US); Quoc V. Le, Mountain View, CA (US)

(73) Assignee: Google LLC, Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/798,085

(22) Filed: Oct. 30, 2017

Related U.S. Application Data (63) Continuation of application No. 14/857,709, filed on Sep. 17, 2015, now Pat. No. 9,805,028.

(60) Provisional application No. 62/051,435, filed on Sep. 17, 2014.

(51) Int. Cl.
*G06F 17/28* (2006.01)
*G06F 17/20* (2006.01)
*G06F 17/27* (2006.01)

(52) U.S. Cl.
CPC ............ *G06F 17/289* (2013.01); *G06F 17/20* (2013.01); *G06F 17/27* (2013.01); *G06F 17/275* (2013.01); *G06F 17/2785* (2013.01); *G06F 17/28* (2013.01); *G06F 17/2818* (2013.01); *G06F 17/2836* (2013.01); *G06F 17/2854* (2013.01); *G06F 17/274* (2013.01)

(58) Field of Classification Search
None
See application file for complete search history.

(56) References Cited

U.S. PATENT DOCUMENTS

| | | | |
|---|---|---|---|
| 4,635,199 A | 1/1987 | Muraki | |
| 5,426,583 A | 6/1995 | Uribe-Echebarria Diaz De Mendibil | |
| 5,442,546 A | 8/1995 | Kaji et al. | |

(Continued)

OTHER PUBLICATIONS

Gao J, He X, Yih WT, Deng L. Learning continuous phrase representations for translation modeling. InProceedings of the 52nd Annual Meeting of the Association for Computational Linguistics (vol. 1: Long Papers) Jun. 2014 (vol. 1, pp. 699-709). (Year: 2014).*

(Continued)

*Primary Examiner* — Jonathan C Kim
(74) *Attorney, Agent, or Firm* — Fish & Richardson P.C.

(57) ABSTRACT

Methods, systems, and apparatus, including computer programs encoded on computer storage media, for translating terms using numeric representations. One of the methods includes obtaining data that associates each term in a vocabulary of terms in a first language with a respective high-dimensional representation of the term; obtaining data that associates each term in a vocabulary of terms in a second language with a respective high-dimensional representation of the term; receiving a first language term; and determining a translation into the second language of the first language term from the high-dimensional representation of the first language term and the high-dimensional representations of terms in the vocabulary of terms in the second language.

18 Claims, 4 Drawing Sheets

(56) References Cited

U.S. PATENT DOCUMENTS

| | | | |
|---|---|---|---|
| 5,477,451 A * | 12/1995 | Brown | G06F 17/2755 |
| | | | 704/2 |
| 5,523,946 A | 6/1996 | Kaplan et al. | |
| 5,724,593 A | 3/1998 | Hargrave, III et al. | |
| 5,848,389 A | 12/1998 | Asano et al. | |
| 6,275,789 B1 | 8/2001 | Moser et al. | |
| 6,463,404 B1 | 10/2002 | Appleby | |
| 6,490,548 B1 | 12/2002 | Engel | |
| 6,937,974 B1 | 8/2005 | D'Agostini | |
| 7,702,673 B2 | 4/2010 | Hull | |
| 8,135,575 B1 | 3/2012 | Dean | |
| 8,706,472 B2 | 4/2014 | Ramerth et al. | |
| 8,775,341 B1 | 7/2014 | Commons | |
| 8,825,648 B2 | 9/2014 | Ni | |
| 9,037,464 B1 * | 5/2015 | Mikolov | G06F 17/2785 |
| | | | 704/255 |
| 9,262,406 B1 | 2/2016 | Das | |
| 9,323,746 B2 | 4/2016 | Bangalore et al. | |
| 9,805,028 B1 * | 10/2017 | Sutskever | G06F 17/289 |
| 10,241,997 B1 * | 3/2019 | Mikolov | G06F 17/2785 |
| 2003/0126559 A1 | 7/2003 | Fuhrmann | |
| 2003/0191643 A1 | 10/2003 | Belenger et al. | |
| 2003/0216919 A1 | 11/2003 | Roushar | |
| 2004/0122656 A1 | 6/2004 | Abir | |
| 2004/0158561 A1 | 8/2004 | Gruenwald | |
| 2005/0055217 A1 | 3/2005 | Sumita et al. | |
| 2005/0102130 A1 | 5/2005 | Quirk et al. | |
| 2005/0143971 A1 | 6/2005 | Burstein | |
| 2005/0273315 A1 | 12/2005 | Laitila | |
| 2006/0009963 A1 * | 1/2006 | Gaussier | G06F 17/2735 |
| | | | 704/7 |
| 2006/0015318 A1 * | 1/2006 | Moore | G06F 17/2818 |
| | | | 704/2 |
| 2006/0095248 A1 | 5/2006 | Menezes | |
| 2006/0265209 A1 * | 11/2006 | Bradford | G06F 17/2809 |
| | | | 704/9 |
| 2007/0061152 A1 | 3/2007 | Doi | |
| 2007/0083359 A1 | 4/2007 | Bender | |
| 2008/0162117 A1 * | 7/2008 | Bangalore | G06F 17/2818 |
| | | | 704/10 |
| 2008/0306727 A1 | 12/2008 | Thurmair et al. | |
| 2008/0319735 A1 | 12/2008 | Kambhatla | |
| 2009/0083023 A1 * | 3/2009 | Foster | G06F 17/2827 |
| | | | 704/3 |
| 2009/0119090 A1 | 5/2009 | Niu | |
| 2009/0204401 A1 | 8/2009 | Bu | |
| 2009/0248394 A1 * | 10/2009 | Sarikaya | G06F 17/2818 |
| | | | 704/4 |
| 2010/0023311 A1 | 1/2010 | Subrahmanian | |
| 2010/0204981 A1 | 8/2010 | Ribeiro et al. | |
| 2010/0324909 A1 | 12/2010 | Runge et al. | |
| 2011/0184718 A1 | 7/2011 | Chen | |
| 2011/0314006 A1 | 12/2011 | Sweeney et al. | |
| 2012/0253785 A1 * | 10/2012 | Hamid | G06F 17/2229 |
| | | | 704/4 |
| 2012/0323554 A1 | 12/2012 | Hopkins | |
| 2013/0289970 A1 | 10/2013 | Liebermann | |
| 2014/0257794 A1 | 9/2014 | Gandrabur | |
| 2014/0280072 A1 | 9/2014 | Coleman | |
| 2014/0309990 A1 | 10/2014 | Gandrabur | |
| 2014/0358519 A1 | 12/2014 | Mirkin et al. | |
| 2015/0058019 A1 | 2/2015 | Chen | |
| 2015/0106076 A1 * | 4/2015 | Hieber | G06F 17/2854 |
| | | | 704/2 |
| 2016/0085748 A1 * | 3/2016 | Goto | G06F 17/2818 |
| | | | 704/4 |

OTHER PUBLICATIONS

Haghighi A, Liang P, Berg-Kirkpatrick T, Klein D. Learning bilingual lexicons from monolingual corpora. In Proceedings of ACL-08: Hlt Jun. 2008 (pp. 771-779). (Year: 2008).*

U.S. Appl. No. 14/857,709, filed Sep. 17, 2015, Sutskever et al.

Haghighi et al., "Learning Bilingual Lexicons from Monolingual Corpora," (2008) [online] (retrieved from http://nlp.cs.berkeley.edu/pubs/Haghighi-Liang-BergKirkpatrick-Klein_2008_Lexicons_paper.pdf) 9 pages.

Koehn and Knight, "Learning a Translation Lexicon from Monolingual Corpora," (2002) [online] (retrieved from http://www.aclweb.org/anthology/W02-0902.pdf), 8 pages.

Mikolov et al., "Efficient Estimation of Word Representations in Vector Space," (2013) [online] (retrieved from http://arxiv.org/pdf/1301.3781v3.pdf), 12 pages.

* cited by examiner

TRANSLATING TERMS USING NUMERIC REPRESENTATIONS

CROSS-REFERENCE TO RELATED APPLICATION

This application claims priority to and is a continuation of U.S. patent application Ser. No. 14/857,709, filed on Sep. 17, 2015, which claims the benefit of U.S. Provisional Application No. 62/051,435, filed on Sep. 17, 2014. The disclosures of the prior applications are considered part of and are incorporated by reference in the disclosure of this application.

BACKGROUND

This specification relates to translating terms from a source language into a target language using numeric representations of terms in the source language and numeric representations of terms in the target language.

Machine translation systems can use various techniques in an attempt to translate words from a source language to a target language. For example, some machine translation systems use dictionaries to translate a term from a source language into the target language.

SUMMARY

This specification generally describes how a system implemented as computer programs on one or more computers in one or more locations can generate translations of terms in a vocabulary of terms from one language to another.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a translation system that generates translations of terms in a vocabulary of terms in a source language into a target language. Generally, the translation system generates the translations of the terms using high-dimensional representations of the terms in the vocabulary and high-dimensional representations of terms in a vocabulary of terms in the target language.

Figure 1:
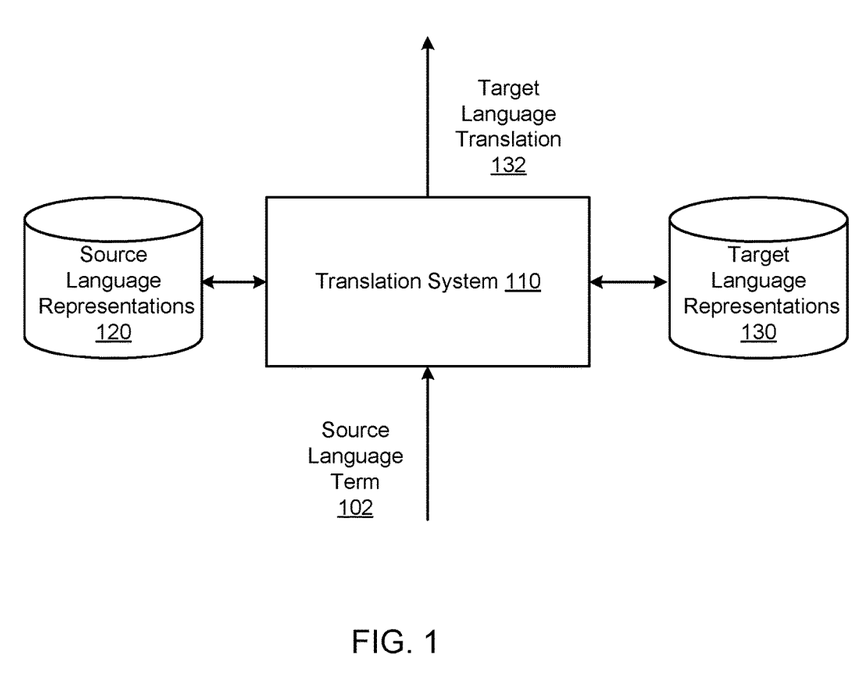
FIG. 1 shows an example translation system.

FIG. 1 shows an example translation system 100. The translation system 100 is an example of a system implemented as computer programs on one or more computers in one or more locations, in which the systems, components, and techniques described below can be implemented.

The translation system 100 receives a term in a source language, e.g., a source language term 102, and generates a translation of the source language term into a target language, e.g., a target language translation 132 of the source language term 102. In particular, the translation system generates the translation using high-dimensional representations of source language terms in a source language representations data store 120 and high-dimensional representations of target language terms in target language representation data store 130.

The source language representations data store 120 stores data that associates each term in a vocabulary of terms in the source language with a respective high-dimensional representation of the term. A high-dimensional representation of a term is a numeric representation, e.g., a vector of numeric values, of the term in a high-dimensional space.

The target language representations data store 130 stores data that associates each term in a vocabulary of terms in the target language with a respective high-dimensional representation of the term.

Generally, the associations for a given language are generated so that the relative locations of terms in the vocabulary of terms in the given language reflect semantic and syntactic similarities between the terms in the given language. That is, the relative locations of terms in the high-dimensional space reflect syntactic similarities between the terms, e.g., showing that, by virtue of their relative location in the space, words that are similar to the word "he" may include the words "they," "me," "you," and so on, and semantic similarities, e.g., showing that, by virtue of their relative locations in the space the word "queen" is similar to the words "king" and "prince." Furthermore, relative locations in the space may show that the word "king" is similar to the word "queen" in the same sense as the word "prince" is similar to the word "princess," and, in addition, that the word "king" is similar to the word "prince" as the word "queen" is similar to the word "princess."

Additionally, in some implementations, operations can be performed on the locations to identify words that have a desired relationship to other words. In particular, vector subtraction and vector addition operations performed on the locations can be used to determine relationships between words. For example, in order to identify a word X that has a similar relationship to a word A as a word B has to a word C, the following operation may be performed on the vectors representing words A, B, and C: vector(B)−vector(C)+vector(A). For example, the operation vector("Man")−vector("Woman")+vector("Queen") may result in a vector that is close to the vector representation of the word "King."

Associations of terms to high-dimensional vector representations having these characteristics can be generated by training a machine learning system configured to process each term in the vocabulary of terms in a given language to obtain a respective numeric representation of each term in the vocabulary in the high-dimensional space and to associate each term in the vocabulary with the respective numeric representation of the term in the high-dimensional space. Example techniques for training such a system and generating the associations for a given language are described in Tomas Mikolov, Kai Chen, Greg S. Corrado, and Jeffrey Dean, *Efficient estimation of word representations in vector space*, International Conference on Learning Representations (ICLR), Scottsdale, Ariz., USA, 2013.

Generating a translation for a source language term using high-dimensional representations of terms is described in more detail below with reference to FIGS. 2 and 3.

Figure 2:
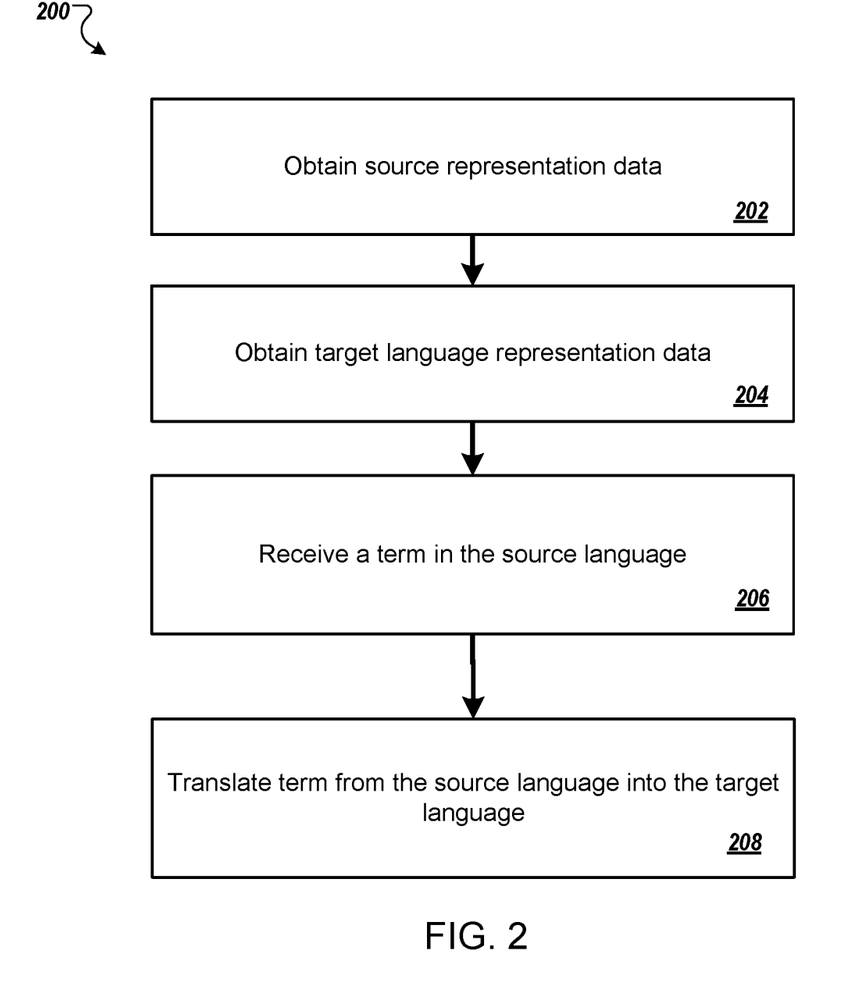
FIG. 2 is a flow diagram of an example process for generating a translation of a source language term into a target language.

FIG. 2 is a flow diagram of an example process 200 for generating a translation for a term in the source language. For convenience, the process 200 will be described as being performed by a system of one or more computers located in one or more locations. For example, a translation system, e.g., the translation system 100 of FIG. 1, appropriately programmed, can perform the process 200.

The system obtains source language representation data (step 202). The source language representation data associates each term in a vocabulary of terms in the source language with a respective high-dimensional representation of the term. A high-dimensional representation of a term is a numeric representation, e.g., a vector of numeric values, of the term in a high-dimensional space.

The system obtains target language representation data (step 204). The target language representation data associates each term in a vocabulary of terms in the target language with a respective high-dimensional representation of the term.

The system receives a source language term, i.e., a term in the source language (step 206). The source language term is one of the terms in the vocabulary of terms in the source language that are each associated with a respective high-dimensional representation.

The system translates the source language term from the source language into the target language using the high-dimensional representation of the source language term and the target language representation data (step 208). Using high-dimensional representations to generate a translation of the source language term is described in more detail below with reference to FIG. 3.

Figure 3:
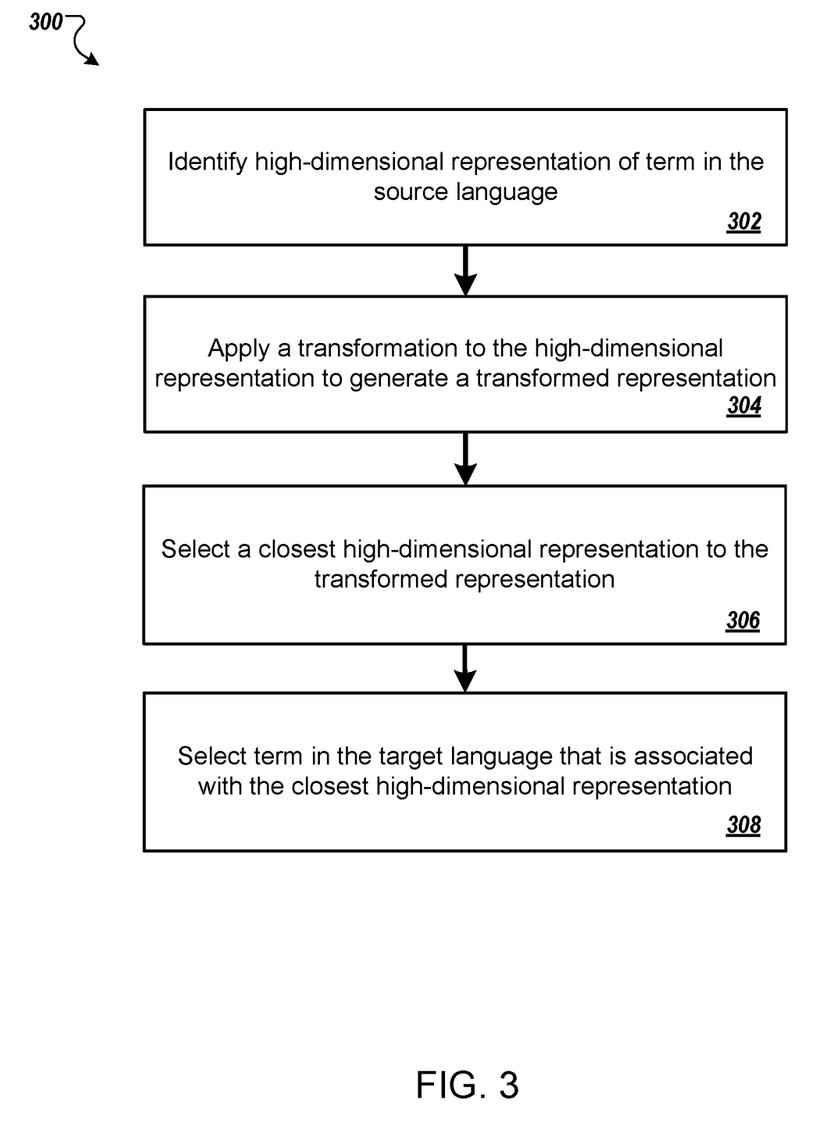
FIG. 3 is a flow diagram of an example process for using high-dimensional representations to generate a translation of a source language term.

FIG. 3 is a flow diagram of an example process 300 for using high-dimensional representations to generate a translation of a source language term. For convenience, the process 300 will be described as being performed by a system of one or more computers located in one or more locations. For example, a translation system, e.g., the translation system 100 of FIG. 1, appropriately programmed, can perform the process 300.

The system identifies, using the source language representation data, a high-dimensional representation of the source language term (step 302).

The system applies a transformation to the identified high-dimensional representation to generate a transformed representation (step 304). Generally, the system applies the transformation in accordance with trained values of a set of parameters. In some implementations, the transformed representation z satisfies z=Wx, with W being a matrix of the trained values of the set of parameters and x being the high-dimensional representation of the term in the source language. Determining the trained values of the parameters is described in more detail below with reference to FIG. 4.

The system selects, from the high-dimensional representations of the terms in the vocabulary of terms in the target language identified in the target language representation data, the closest high-dimensional representation to the transformed representation (step 306). That is, the system selects the closest high-dimensional representation to the transformed representation that is associated with a term in the target language. In some implementations, the system selects the high-dimensional representation having the largest cosine similarity with the representation of the source language term of any of the representations that are associated with terms in the target language as the closest high-dimensional representation.

The system selects the term in the target language that is associated with the closest high-dimensional representation as the translation of the source language term into the target language (step 308).

In some implementations, the system also uses the largest cosine similarity value as a confidence score for the translation of the term and determines that the translation of the source language term into the target language is valid only when the confidence score exceeds a threshold value. If the translation is determined to not be valid, the system can skip translating the source language term.

In some implementations, the system can perform the processes 200 and 300 to determine whether an existing translation of the source language term, e.g., in a dictionary or other translation service, is likely correct or incorrect. In particular, the system can perform the processes 200 and 300 to select a translation of the source language term into the target language. The system can then determine a distance, e.g., a cosine similarity, between the high-dimensional representation of the selected translation and a high-dimensional representation of the existing translation of the source language term into the second language of the term in the first language. The system can then classify the existing translation as either likely correct or likely incorrect based on the distance. For example, when the distance metric is cosine similarity, the system can determine that the existing translation is likely correct when the cosine similarity exceeds a threshold value and likely incorrect when the cosine similarity does not exceed the threshold value.

Figure 4:
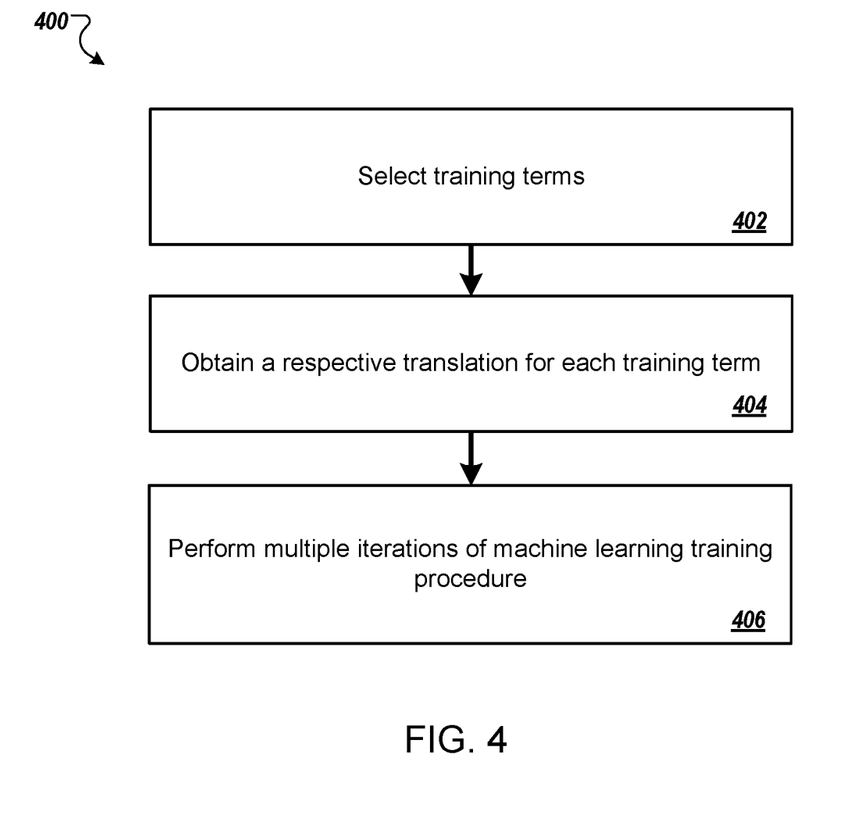
FIG. 4 is a flow diagram of an example process for determining trained values of a set of transformation parameters.

FIG. 4 is a flow diagram of an example process 400 for determining trained values of a set of transformation parameters. For convenience, the process 400 will be described as being performed by a system of one or more computers located in one or more locations. For example, a translation system, e.g., the translation system 100 of FIG. 1, appropriately programmed, can perform the process 400.

The system selects a set of training terms in the source language (step 402). In some implementations, the system selects a pre-determined number of most frequently occurring terms from the vocabulary of terms in the source language as the training terms.

The system obtains a respective translation of each training term (step 404). In particular, the system obtains a translation into the target language for each of the training terms from a translation service, e.g., an online dictionary or online machine translation service.

The system performs multiple iterations of a machine learning training procedure to determine trained values of the transformation parameters from initial values of the translation parameters using the training terms and the translations of the training terms as training data (step 406). In particular, the system performs the machine learning training procedure, e.g., stochastic gradient descent, to determine a matrix of values W that satisfies:

$$\min_W \sum_{i=1}^n \|Wx_i - z_i\|^2$$

where n is the total number of training terms, $x_i$ is the high-dimensional representation of an i-th training term in the source language, and $z_i$ is the high-dimensional representation of the translation into the target language of the i-th training term.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining a plurality of training terms in a first language;
   identifying respective high-dimensional representations of the plurality of training terms;
   obtaining translations for the plurality of training terms, the translations being in a second language;
   identifying respective high-dimensional representations of the translations for the plurality of training terms;
   determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:
      obtaining current values of the transformation parameters,
      processing, using the current values of the transformation parameters, each of the high-dimensional representations of one or more of the training terms to generate a respective high-dimensional representation of an output term for the training term,
      determining, for each of the one or more training terms, a respective difference between the high-dimensional representation of the translation for the training term and the high-dimensional representation of the output term for the training term, and
      modifying the current values of the transformation parameters to lower the respective differences; and
   providing the trained values of the transformation parameters for use in translating a term in the first language to a term in the second language using a high-dimensional representation of the term in the first language and a high-dimensional representation of the term in the second language.

2. The method of claim 1, further comprising:
   obtaining a plurality of terms in the first language; and
   processing each term of the plurality of terms in the first language in accordance with the trained values of the transformation parameters to generate a respective translation for the term, the respective translation being in the second language.

3. The method of claim 1, wherein the high-dimensional representations of the plurality of training terms are numeric representations of the plurality of training term in a high-dimensional space, and
   wherein the high-dimensional representations of the translations for the plurality of training terms are numeric representations of the translations for the plurality of training terms in the high-dimensional space.

4. The method of claim 1, wherein the machine learning technique is stochastic gradient descent.

5. The method of claim 1, wherein obtaining the plurality of training terms in the first language includes:
   obtaining a pre-determined number of most frequently occurring terms from a vocabulary of terms in the first language.

6. A method comprising:
   obtaining a plurality of training terms in a first language;
   identifying respective high-dimensional representations of the plurality of training terms;
   obtaining translations for the plurality of training terms, the translations being in a second language;
   identifying respective high-dimensional representations of the translations for the plurality of training terms;
   determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:
   performing multiple iterations of a machine learning training procedure to determine a matrix of values W of the transformation parameters that satisfies:

$$\min_W \sum_{i=1}^{n} \|Wx_i - z_i\|^2,$$

wherein n is the total number of training terms, $x_i$ is the high-dimensional representation of an i-th training term, and $z_i$ is the high-dimensional representation of the translation of the i-th training term; and
   providing the trained values of the transformation parameters for use in translating a term in the first language to a term in the second language using a high-dimensional representation of the term in the first language and a high-dimensional representation of the term in the second language.

7. A system comprising one or more computers and one or more storage devices storing instructions that when executed by the one or more computers cause the one or more computers to perform system operations comprising:
obtaining a plurality of training terms in a first language;
identifying respective high-dimensional representations of the plurality of training terms;
obtaining translations for the plurality of training terms, the translations being in a second language;
identifying respective high-dimensional representations of the translations for the plurality of training terms;
determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:
obtaining current values of the transformation parameters,
processing, using the current values of the transformation parameters, each of the high-dimensional representations of one or more of the training terms to generate a respective high-dimensional representation of an output term for the training term,
determining, for each of the one or more training terms, a respective difference between the high-dimensional representation of the translation for the training term and the high-dimensional representation of the output term for the training term, and
modifying the current values of the transformation parameters to lower the respective differences; and
providing the trained values of the transformation parameters for use in translating a term in the first language to a term in the second language using a high-dimensional representation of the term in the first language and a high-dimensional representation of the term in the second language.

8. The system of claim 7, the operations further comprising:
obtaining a plurality of terms in the first language; and
processing each term of the plurality of terms in the first language in accordance with the trained values of the transformation parameters to generate a respective translation for the term, the respective translation being in the second language.

9. The system of claim 7, wherein the high-dimensional representations of the plurality of training terms are numeric representations of the plurality of training term in a high-dimensional space, and
wherein the high-dimensional representations of the translations for the plurality of training terms are numeric representations of the translations for the plurality of training terms in the high-dimensional space.

10. The system of claim 7, wherein the machine learning technique is stochastic gradient descent.

11. The system of claim 7, wherein obtaining the plurality of training terms in the first language includes:
obtaining a pre-determined number of most frequently occurring terms from a vocabulary of terms in the first language.

12. A system comprising one or more computers and one or more storage devices storing instructions that when executed by the one or more computers cause the one or more computers to perform operations comprising:
obtaining a plurality of training terms in a first language;
identifying respective high-dimensional representations of the plurality of training terms;
obtaining translations for the plurality of training terms, the translations being in a second language;
identifying respective high-dimensional representations of the translations for the plurality of training terms;
determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:
performing multiple iterations of a machine learning training procedure to determine a matrix of values W of the transformation parameters that satisfies:

$$\min_{W} \sum_{i=1}^{n} \|Wx_i - z_i\|^2,$$

wherein n is the total number of training terms, $x_i$ is the high-dimensional representation of an i-th training term, and $z_i$ is the high-dimensional representation of the translation of the i-th training term; and
providing the trained values of the transformation parameters for use in translating a term in the first language to a term in the second language using a high-dimensional representation of the term in the first language and a high-dimensional representation of the term in the second language.

13. A non-transitory computer-readable storage medium encoded with a computer program, the computer program comprising instructions that, when executed by one or more computers, cause the one or more computers to perform operations comprising:
obtaining a plurality of training terms in a first language;
identifying respective high-dimensional representations of the plurality of training terms;
obtaining translations for the plurality of training terms, the translations being in a second language;
identifying respective high-dimensional representations of the translations for the plurality of training terms;
determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:
obtaining current values of the transformation parameters,
processing, using the current values of the transformation parameters, each of the high-dimensional representations of one or more of the training terms to generate a respective high-dimensional representation of an output term for the training term, determining, for each of the one or more training terms, a respective difference between the high-dimensional representation of the translation for the training term and the high-dimensional representation of the output term for the training term, and modifying the current values of the transformation parameters to lower the respective differences; and providing the trained values of the transformation parameters for use in translating a term in the first language to a term in the second language using a high-dimensional representation of the term in the first language and a high-dimensional representation of the term in the second language.

14. The computer-readable storage medium of claim 13, wherein determining the trained values of the transformation parameters comprises:

obtaining initial values of the transformation parameters, processing, using the initial values of the transformation parameters, each of the high-dimensional representations of the training terms to generate a respective high-dimensional representation of an output term for the training term, determining a difference between the high-dimensional representation of the translation for the training term and the high-dimensional representation of the output term for the training term, and modifying the initial values of the transformation parameters to lower the difference.

15. The computer-readable storage medium of claim 13, further comprising:

obtaining a plurality of terms in the first language; and processing each term of the plurality of terms in the first language in accordance with the trained values of the transformation parameters to generate a respective translation for the term, the respective translation being in the second language.

16. The computer-readable storage medium of claim 13, wherein the high-dimensional representations of the plurality of training terms are numeric representations of the plurality of training term in a high-dimensional space, and wherein the high-dimensional representations of the translations for the plurality of training terms are numeric representations of the translations for the plurality of training terms in the high-dimensional space.

17. The computer-readable storage medium of claim 13, wherein obtaining the plurality of training terms in the first language includes:

obtaining a pre-determined number of most frequently occurring terms from a vocabulary of terms in the first language.

18. A non-transitory computer-readable storage medium encoded with a computer program, the computer program comprising instructions that, when executed by one or more computers, cause the one or more computers to perform operations comprising:

obtaining a plurality of training terms in a first language;

identifying respective high-dimensional representations of the plurality of training terms;

obtaining translations for the plurality of training terms, the translations being in a second language;

identifying respective high-dimensional representations of the translations for the plurality of training terms;

determining, by applying a machine learning technique to the high-dimensional representations of the training terms and the high-dimensional representations of the translations, trained values of transformation parameters that are used to transform a high-dimensional representation of a first term in the first language to a high-dimensional representation of a second term in the second language that is a translation of the first term, comprising:

performing multiple iterations of a machine learning training procedure to determine a matrix of values W of the transformation parameters that satisfies:

$$\min_{W} \sum_{i=1}^{n} \|Wx_i - z_i\|^2,$$

wherein n is the total number of training terms, $x_i$ is the high-dimensional representation of an i-th training term, and $z_i$ is the high-dimensional representation of the translation of the i-th training term; and providing the trained values of the transformation parameters for use in translating a term in the first language to a term in the second language using a high-dimensional representation of the term in the first language and a high-dimensional representation of the term in the second language.

* * * * *